United States Patent Office 3,115,517
Patented Dec. 24, 1963

3,115,517
PROCESS FOR THE PREPARATION OF
CARBONYL CYANIDE
William J. Linn, Wilmington, Del., assignor to E. I. du
Pont de Nemours and Company, Wilmington, Del., a
corporation of Delaware
No Drawing. Filed Dec. 27, 1961, Ser. No. 162,574
6 Claims. (Cl. 260—465.8)

This invention relates to a new process for the preparation of carbonyl cyanide.

Carbonyl cyanide is a highly reactive chemical compound which has been found useful as a reagent for the structural characterization of selected olefins with which it reacts to give characteristically colored addition compounds. Carbonyl cyanide has also been found highly useful for reacting with conjugated dienes in the Diels-Alder reaction to prepare the corresponding 2,2-dicyanodihydropyrans. The supply of carbonyl cyanide has been greatly limited because the only known synthesis requires four separate steps starting with acetone dicarboxylic acid, involves a serious hazard of explosion in the pyrolysis of the diacetyl derivative of diisonitrosoacetone, and, at best, gives an over-all yield of only 40% [O. Achmatowicz and M. Leplawy, Roczniki chemii, 32, 1375–79 (1958)]. A more direct synthesis of carbonyl cyanide represents a highly desirable goal.

It has now been discovered that carbonyl cyanide can be prepared directly by the reaction of tetracyanoethylene oxide with an organic sulfide, disulfide, or sulfoxide at a temperature of −100° C. to 200° C. Because of the known reaction of carbonyl cyanide with olefinic compounds, the sulfur-containing reactants should be free of aliphatic carbon-to-carbon unsaturation.

The sulfides, disulfides, and sulfoxides operable in the process of this invention may be represented by the formula R—Q—R′, where R and R′, which may be the same or different, are aliphatically saturated hydrocarbyl or substituted hydrocarbyl; —Q— is —S—, —S—S—, or

and R and R′ jointly (—R—R′—) represent aliphatically saturated hydrocarbylene, e.g., the tetramethylene of tetrahydrothiophene, the trimethylene of 1,2-dithiolane, the heptamethylene of thiocane, the tetramethylene of tetrahydrothiophene oxide, and the like. Thus, by the term "aliphatically saturated hydrocarbylene" is meant the diradical formed by removal of one hydrogen atom from each of two different carbons of an aliphatically saturated hydrocarbon.

The word "hydrocarbyl" is used in its accepted meaning as representing a radical formed from a hydrocarbon by removal of a hydrogen atom. The hydrocarbyl groups represented by the R's in the formula above may be any aliphatically saturated radical composed solely of carbon and hydrogen. The wide variation in the hydrocarbyl groups used in the illustrations which follow makes it evident that all hydrocarbyl groups free of aliphatic unsaturation are operable whether they are alkyl, cycloalkyl, aryl, aralkyl, alkaryl, single ring, multi ring, straight chain, branched chain, large, or small. The widest variation of this sort does not in any way detract from the fundamental characteristic of the aliphatically saturated hydrocarbyl radical, i.e., it passes unchanged through the process of this invention and exercises no effect whatever on the chemical steps of the process. Representative hydrocarbyl groups include methyl, tert.-butyl, isooctyl, dodecyl, octadecyl, eicosyl, cyclopropyl, cyclobutyl, cyclohexyl, cyclooctyl, phenyl, naphthyl, anthryl, rubryl, benzyl, phenethyl, duryl, 4-isopropylnaphthyl, chrysyl, and the like.

Even the most cumbersome aliphatically saturated hydrocarbyl radicals, such as those obtained by removing end groups from high molecular weight hydrocarbon polymer molecules containing thousands of carbon atoms, such as polyethylene, polyisobutylene, polystyrene, and the like, are fully operable.

Substituted hydrocarbyl groups which are free of functions which are reactive with carbonyl cyanide are also fully operable, particularly those having as substituents alkoxy, alkylcarbonyl and alkylsulfonyl (acyl), formyl, alkoxycarbonyl, cyano, nitro, or halogen, i.e., fluoro, chloro, bromo, or iodo. Such substituted groups do not participate in the reaction but merely pass unchanged through the process as in the case of the unsubstituted hydrocarbyl groups.

Obviously, compounds wherein the R, R′ and

groups contain 20 or fewer carbon atoms, particularly those wherein each of R and R′ is an unsubstituted hydrocarbyl group, are most readily available, and to that extent preferred. But there is to be no question of the operability of, or of the intent to include and disclose, any hydrocarbyl group, substituted hydrocarbyl group which is free of interfering functions, or hydrocarbylene group whatsoever, as long as it is free of aliphatic carbon-to-carbon unsaturation.

Pressure is not a critical factor in the process of this invention, and pressures both below and above atmospheric pressure are operable. Atmospheric pressure is preferred for convenience.

As shown in Example I, no added materials are necessary for carrying out the process of this invention. To facilitate the handling of reactants and products, it is preferred to carry out the reaction in the presence of an organic diluent which is inert to the reactants and products. Representative diluents include diethyl ether, tetrahydrofuran, glacial acetic acid, xylene, ethyl acetate, and the like.

The molar ratio of tetracyanoethylene oxide to the organic sulfide, disulfide, or sulfoxide is not critical and may be varied widely, e.g., from 19:1 to 1:19. However, there is no advantage in using a large excess of one or the other and molar ratios of about 1:1 are preferred for best yields.

In the following examples, parts are by weight unless otherwise specified. Example X represents a preferred embodiment.

EXAMPLE I

*Part A.*—A solution of 256 parts of tetracyanoethylene in 1180 parts of acetonitrile is cooled at 0° C. and 344 parts of 30% hydrogen peroxide is added. A transient violet color appears which soon fades to yellow. The solution is agitated and then diluted with 10,000 parts of ice water. The oil which separates soon solidifies and is collected by filtration and dried to give 200 parts (70% yield) of colorless crystals of tetracyanoethylene oxide. It is purified by recrystallization from ethylene dichloride.

*Part B.*—Tetracyanoethylene oxide (one part) is mixed with about 7 parts of dimethyl sulfide in a glass reactor at room temperature. The solution turns first yellow, then red, and heat is given off. A solid precipitate of dimethylsulfonium dicyanomethylide (dicyano-S,S-dimethylsulfilidene) forms which is removed by filtration, leaving as a filtrate a solution of carbonyl cyanide in dimethyl sulfide.

EXAMPLE II

A solution of 186 parts of dimethyl sulfide in 1770 parts of diethyl ether is cooled at 0° C. and stirred. To this there is added 144 parts of tetracyanoethylene oxide.

The reaction mixture is stirred for one hour and filtered to remove the solid precipitate of dimethylsulfonium dicyanomethylide (dicyano-S,S-dimethylsulfilidene) which forms. The filtrate containing carbonyl cyanide is treated slowly with a solution of 93 parts of aniline in 350 parts of ether. After five minutes the ethereal solution is evaporated to leave 127 parts of a pale orange solid which is recrystallized from benzene to give light tan crystals, M.P. 123–125° C. This product is identified as N-cyanoformylaniline, the reaction product of carbonyl cyanide and aniline reported by R. Malachowski and J. Jankiewicz-Wasowska, Roczniki chemii, 25, 39 (1951).

EXAMPLE III

To a solution of 130 parts of dimethyl sulfide in 1770 parts of diethyl ether at 0° C. there is added 144 parts of tetracyanoethylene oxide. The reaction mixture is stirred for two hours and filtered to remove dimethylsulfonium dicyanomethylide (dicyano-S,S-dimethylsulfilidene). To the filtrate containing carbonyl cyanide there is added 121 parts of dimethylaniline. An exothermic reaction ensues and a solid precipitates. The solid is recrystallized from glacial acetic acid to give 42 parts of light pink crystals, M.P. 196–197° C. This product is identified by analysis and by melting point as bis(p-dimethylaminophenyl)dicyanomethane, the known reaction product of carbonyl cyanide and dimethylaniline.

EXAMPLE IV

To a solution of 62 parts of dimethyl sulfide in 730 parts of glacial acetic acid at 0° C. there is added in small portions 144 parts of tetracyanoethylene oxide. To the resulting yellow-red solution containing carbonyl cyanide there is added 242 parts of dimethylaniline. After a short period, a precipitate of bis(p-dimethylaminophenyl)dicyanomethane forms and this is collected by filtration, washed with glacial acetic acid, and dried. Thus, there are obtained 63 parts of this known reaction product of dimethylaniline and carbonyl cyanide.

EXAMPLE V

To a solution of 136 parts of dimethyl sulfide in 3540 parts of diethyl ether at 0° C. there is added 288 parts of tetracyanoethylene oxide. The resulting suspension is stirred for five hours at room temperature. The pressure is then reduced to about 20 mm. and all material volatile at room temperature at 20 mm. is distilled off and passed through a condenser cooled at −80° C. The vacuum is then removed and the solution of carbonyl cyanide in diethyl ether collected in the condenser is allowed to warm to room temperature. To this there is added 186 parts of aniline dissolved in 350 parts of ether. This solution is allowed to stand for one-half hour and then evaporated to leave a light green solid which is recrystallized from benzene to give 158 parts of cream-colored crystals of N-cyanoformylaniline.

EXAMPLE VI

To a solution of 321 parts of di-n-butyl sulfide in 3540 parts of diethyl ether at 0° C. there is added 288 parts of tetracyanoethylene oxide. The reaction mixture is stirred at room temperature for a total of four hours. The pressure is then reduced to 15–20 mm. and all material volatile under these conditions is distilled off and passed through a condenser cooled at −80° C. The pale yellow solution of carbonyl cyanide in diethyl ether which collects in the condenser is allowed to warm to room temperature and 186 parts of aniline is added. After one-half hour the solvent is evaporated to leave a residual solid which is recrystallized from benzene to give 93 parts of N-cyanoformylaniline.

EXAMPLE VII

To a solution of 342 parts of dimethyl sulfide in 3540 parts of diethyl ether there is added 720 parts of tetracyanoethylene oxide. The reaction mixture is stirred for four hours and the pressure is reduced to about 20 mm. to distill the volatiles through an attached condenser cooled at −80° C. The ethereal solution of carbonyl cyanide is allowed to warm to room temperature and the infrared spectrum is examined. In addition to the spectrum of the diethyl ether, there are noted the three bands characteristic of carbonyl cyanide at $4.45\mu$, $5.84\mu$, and $14.25\mu$.

EXAMPLE VIII

A suspension of 720 parts of tetracyanoethylene oxide in 4350 parts of sodium-dried xylene is cooled to 0° C. and 342 parts of dimethyl sulfide in 870 parts of xylene is added with stirring. After 3.5 hours the pressure is reduced to 20 mm. and volatile material is distilled through a condenser cooled at −80° C. The solution collected in the condenser is distilled to give 100 parts of carbonyl cyanide, B.P. 63–67° C. For structural identification, this product is added to a solution of 122 parts of dimethylaniline in 730 parts of glacial acetic acid. An exothermic reaction occurs with the precipitation of a pale green solid which is recrystallized from benzene to give 67 parts of pale green crystals of bis(p-dimethylaminophenyl)dicyanomethane, M. P. 194–196° C.

EXAMPLE IX

A suspension of 720 parts of tetracyanoethylene oxide in 4350 parts of anhydrous xylene is stirred and heated to 70–75° C. To this suspension there is added slowly 930 parts of diphenyl sulfide. The resulting dark red solution is heated at 70–75° C. for one hour. The pressure is then reduced to about 20 mm. and volatile material is distilled through a condenser cooled at −80° C. The material collected in the condenser is allowed to warm to room temperature and the yellow solution is distilled to give 120 parts of pale yellow liquid, B.P. 67° C., which is identified as carbonyl cyanide by its infrared spectrum.

EXAMPLE X

A solution of 720 parts of tetracyanoethylene oxide in 4500 parts of ethyl acetate is heated to reflux and 930 parts of diphenyl sulfide is added slowly. The reaction mixture is heated for an additional three hours and then cooled to room temperature. The pressure is reduced to about 20 mm. and volatile material is distilled through a condenser cooled at −80° C. An infrared spectrum of the solution collected in the condenser indicates the presence of carbonyl cyanide. There is added to the solution 232 parts of aniline and after 30 minutes the solvent is evaporated to leave a crystalline residue which is recrystallized from benzene to give 285 parts of straw-colored crystals of N-cyanoformylaniline.

EXAMPLE XI

A solution of 72 parts of tetracyanoethylene oxide in 450 parts of ethyl acetate is stirred and 67 parts of diethyl disulfide is added slowly. The reaction mixture is heated to reflux for three hours and then cooled to room temperature. The pressure is reduced to 20 mm. at room temperature to distill all of the volatile material through a condenser cooled to −80° C. The presence of carbonyl cyanide in the solution collected in the condenser is shown by the addition of 60 parts of dimethylaniline whereupon there is precipitated 18 parts of bis(p-dimethylaminophenyl)dicyanomethane, M.P. 196–198° C., the known reaction product of carbonyl cyanide and dimethylaniline.

EXAMPLE XII

A solution of 720 parts of tetracyanoethylene oxide in 4500 parts of ethyl acetate is stirred and cooled to 0° C. and 406 parts of dimethyl sulfoxide is added slowly. The resulting pale yellow solution is stirred for one hour at 0° C. and then allowed to warm to room temperature and stand for another two hours. The pressure is reduced to 20 mm. and all of the material volatile at 20 mm. and room temperature is distilled off through a condenser cooled at −80° C. When most of the volatile material has been removed from the reaction mixture, a sudden, exothermic reaction occurs is the reaction flask which transforms the residue to a black, carbonaceous solid. The solution collected in the condenser is allowed to warm to room temperature. The presence of carbonyl cyanide in this solution is shown by the addition of 600 parts of dimethylaniline which causes the precipitation of 184 parts of solid which is shown to be bis(p-dimethylaminophenyl)dicyanomethane by a comparison of the infrared spectrum with that of an authentic sample.

Carbonyl cyanide is obtained when the following sulfides are substituted for di-n-butyl sulfide in the procedure of Example VI: diethyl sulfide, ethyl-n-propyl sulfide, n-butyl ethyl sulfide, di-tert.-butyl sulfide, cetyl ethyl sulfide, pentamethylene sulfide, tetramethylene sulfide, phenyl methyl sulfide, phenyl ethyl sulfide, phenyl isopropyl sulfide, phenethyl ethyl sulfide, benzyl phenyl sulfide, benzyl camphyl sulfide, dibenzyl sulfides, α-naphthyl methyl sulfide, dioctadecyl sulfide, cyclopentyl cyclohexyl sulfide, decyl octadecyl sulfide, phenyl t-butyl sulfide, 2-(2,4,6-trinitrophenyl)ethyl methyl sulfide, 4-biphenyl methyl sulfide, 2-(1,2,3,4-tetrahydronaphthyl) methyl sulfide, octadecyl triphenylmethyl sulfide, di(o-nitrobenzyl) sulfide, benzyl α-(9,10-diphenylanthracenyl) sulfide, ethyl α-ethoxyethyl sulfide, β-phenethyl β-phenoxyethyl sulfide, di[2-(2,4,6-tribromophenoxy)ethyl] sulfide, t-butyl chloromethyl sulfide, t-butyl trichloromethyl sulfide, methyl 18-chlorooctadecyl sulfide, di-(bromomethyl) sulfide, ethyl p-iodophenyl sulfide, di(p-iodophenyl) sulfide, di(trifluoromethyl) sulfide, phenyl p-fluorophenyl sulfide, chloromethyl trifluoromethyl sulfide, butyl 2-oxoethyl sulfide, benzyl 3-oxopropyl sulfide, acetonyl t-butyl sulfide, t-butyl β-cyanoethyl sulfide, phenyl β-cyanopropyl sulfide, and methyl β-phenylmercaptopropionate.

When the following disulfides are substituted for diethyl disulfide in the procedure of Example XI, carbonyl cyanide is obtained: dimethyl disulfide, ethyl t-butyl disulfide, di-n-butyl disulfide, di-n-amyl disulfide, diphenyl disulfide, dibenzyl disulfide, p-tolyl disulfide, isobutyl disulfide, dicyclohexyl disulfide, dimethoxymethyl disulfide, di(trifluoromethyl) disulfide, di(β-chloroethyl) disulfide, di(β-iodoethyl) disulfide, di(p-bromophenyl) disulfide, di(α-iodo-β-naphthyl) disulfide, di(o-nitrobenzyl) disulfide, di(p-cyanophenyl) disulfide, di(ethoxycarbonylmethyl) disulfide and bis[p-(methylsulfonyl)phenyl]-disulfide.

Carbonyl cyanide is also obtained when the following sulfoxides are substituted for dimethyl sulfoxide in the procedure of Example XII, diethyl sulfoxide, tetramethylene sulfoxide, diisopentyl sulfoxide, benzyl ethyl sulfoxide, diphenyl sulfoxide, benzyl phenyl sulfoxide, dibenzyl sulfoxide, di(phenethyl) sulfoxide, di(p-nitrobenzyl) sulfoxide, ethyl α-ethoxyethyl sulfoxide, ethyl β-phenoxyethyl sulfoxide, di(trifluoromethyl) sulfoxide, ethyl p-iodophenyl sulfoxide, di(bromoethyl) sulfoxide, t-butyl chloromethyl sulfoxide, acetonyl t-butyl sulfoxide, butyl 2-oxoethyl sulfoxide, t-butyl 2-cyanoethyl sulfoxide, and di(ethoxycarbonylmethyl) sulfoxide.

Since obvious modifications and equivalents in the invention will be evident to those skilled in the chemical arts, I propose to be bound solely by the appended claims.

The embodiments of the invention in which an exclusive property or privilege is claimed are defined as follows:

1. Process for preparing carbonyl cyanide which comprises reacting, at a temperature of −100° C. to 200° C., tetracyanoethylene oxide with an organic compound of the formula R—Q—R′, wherein Q is selected from the class consisting of —S—, —S—S—, and

R and R′ are aliphatically saturated groups and are selected from the class consisting of hydrocarbyl and hydrocarbyl bearing substituents inert to carbonyl cyanide; and R and R′ jointly (—R—R′—) represent aliphatically saturated hydrocarbylene.

2. Process which comprises reacting tetracyanoethylene oxide with dimethyl sulfide at a temperature of −100° C. to 200° C.

3. Process which comprises reacting tetracyanoethylene oxide with di-n-butyl sulfide at a temperature of −100° C. to 200° C.

4. Process which comprises reacting tetracyanoethylene oxide with diphenyl sulfide at a temperature of −100° C. to 200° C.

5. Process which comprises reacting tetracyanoethylene oxide with diethyl disulfide at a temperature of −100° C. to 200° C.

6. Process which comprises reacting tetracyanoethylene oxide with dimethyl sulfoxide at a temperature of −100° C. to 200° C.

No references cited.